United States Patent
Loehr et al.

(10) Patent No.: US 11,991,648 B2
(45) Date of Patent: *May 21, 2024

(54) DETERMINING A POWER HEADROOM REPORT

(71) Applicant: Lenovo (Singapore) Pte. Ltd., New Tech Park (SG)

(72) Inventors: Joachim Loehr, Wiesbaden (DE); Ebrahim MolavianJazi, Lincolnwood, IL (US); Vijay Nangia, Woodridge, IL (US); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,354

(22) Filed: Feb. 15, 2023

(65) Prior Publication Data
US 2023/0199674 A1    Jun. 22, 2023

Related U.S. Application Data

(63) Continuation of application No. 17/206,005, filed on Mar. 18, 2021, now Pat. No. 11,601,896, which is a (Continued)

(51) Int. Cl.
*H04W 52/36*     (2009.01)
*H04W 72/23*     (2023.01)

(52) U.S. Cl.
CPC ......... *H04W 52/365* (2013.01); *H04W 72/23* (2023.01)

(58) Field of Classification Search
CPC . H04W 52/146; H04W 52/242; H04W 52/50; H04W 72/1289
See application file for complete search history.

(56) References Cited

U.S. PATENT DOCUMENTS

2008/0280638 A1* 11/2008 Malladi ................. H04W 52/08 455/67.11
2015/0016317 A1* 1/2015 Park ..................... H04W 52/248 370/280

(Continued)

OTHER PUBLICATIONS

3GGP, "Draft Report of 3GPP TSG RAN WG1 #96 v0.1.0", 25th Feb.-Mar. 1, 2019, pp. 1-150.
(Continued)

*Primary Examiner* — Md K Talukder
(74) *Attorney, Agent, or Firm* — Kunzler Bean & Adamson

(57) ABSTRACT

Apparatuses, methods, and systems are disclosed for determining a power headroom report. One method includes determining a power headroom report for transmission on a physical uplink shared channel resource corresponding to a configured grant. The method includes transmitting the power headroom report on the physical uplink shared channel resource, wherein: determining the power headroom report comprises determining whether the power headroom report is based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

20 Claims, 6 Drawing Sheets

Related U.S. Application Data continuation of application No. 16/690,566, filed on Nov. 21, 2019, now Pat. No. 10,993,195.

(60) Provisional application No. 62/770,619, filed on Nov. 21, 2018.

(56) References Cited

U.S. PATENT DOCUMENTS

| | | | | |
|---|---|---|---|---|
| 2015/0043465 | A1* | 2/2015 | Ouchi | H04L 5/0048 |
| | | | | 370/329 |
| 2015/0124673 | A1* | 5/2015 | Ouchi | H04W 52/58 |
| | | | | 370/311 |
| 2016/0330693 | A1* | 11/2016 | Hwang | H04W 76/15 |
| 2017/0201950 | A1* | 7/2017 | Liu | H04W 52/08 |
| 2017/0223675 | A1* | 8/2017 | Dinan | H04L 5/005 |
| 2019/0044681 | A1* | 2/2019 | Zhang | H04L 5/0094 |
| 2019/0174423 | A1* | 6/2019 | Zhang | H04W 52/146 |
| 2019/0190747 | A1* | 6/2019 | Park | H04L 25/0226 |
| 2020/0037360 | A1* | 1/2020 | Qian | H04B 7/0695 |
| 2020/0163031 | A1* | 5/2020 | Loehr | H04W 72/23 |
| 2020/0305094 | A1* | 9/2020 | Ouchi | H04W 72/23 |

OTHER PUBLICATIONS

Qualcomm, Ericsson, "Draft CR to 38.214 Update to reflect new RRC parameter to enable capability 2", 3GPP TSG RAN WG1 #95 R1-1814334, Nov. 12-16, 2018, pp. 1-5.

Huawei, HiSilicon, "Correction on PHR timing for configured grant", 3GPP TSG RAN WG1 Meeting #96 R1-1903742, Feb. 25-Mar. 1, 2019, pp. 1-4.

Huawei, HiSilicon, "Correction on PHR timing for configured grant", 3GPP TSG RAN WG1 Meeting #96 R1-1903758, Feb. 25-Mar. 1, 2019, pp. 1-4.

Nokia, "[Draft] LS on PHR timing", 3GPP TSG-RAN WG2 Meeting #104 Draft R2-188760, Nov. 12-16, 2018, pp. 1-1.

Nokia et al., "Clarification on PHR timing for configured grant", 3GPP TSG-RAN WG2 Meeting #104 R2-1818770, Nov. 12-16, 2018, pp. 1-5.

Nokia et al., "PHR timing for configured grant", 3GPP TSG-RAN Meeting #82 RP-182706, Dec. 10-13, 2018, pp. 1-4.

3GPP, "3rd Generation Partnership Project; Technical Specification Group Radio Access Network; Study on Scenarios and Requirements for Next Generation Access Technologies; (Release 15)", 3GPP TR 38.913 V15.0.0, Jun. 2018, pp. 1-39.

3Gpp, "3rd Generation Partnership Project; Technical Specification Group Services and System Aspects; System Architecture for the 5G System; Stage 2 (Release 15)", 3GPP TS 23.501 V15.3.0, Sep. 2018, pp. 1-226.

3GPP, "3rd Generation Partnership Project; Technical Specification Group Services and System Aspects; Procedures for the 5G System; Stage 2 (Release 15)", 3GPP TS 23.502 V15.3.0, Sep. 2018, pp. 1-330.

3GPP, "3rd Generation Partnership Project; Technical Specification Group Radio Access Network; NR; Requirements for support of radio resource management (Release 15)", 3GPP TS 38.133 V15.3.0, Sep. 2018, pp. 1-136.

3GPP, "3rd Generation Partnership Project; Technical Specification Group Radio Access Network; NR; Physical channels and modulation (Release 15)", 3GPP TS 38.211 V15.3.0, Sep. 20218, pp. 1-96.

3GPP, "3rd Generation Partnership Project; Technical Specification Group Radio Access Network; NR; Physical layer procedures for control (Release 15)", 3GPP TS 38.213 V15.3.0, Sep. 2018, pp. 1-101.

3GPP, "3rd Generation Partnership Project; Technical Specification Group Radio Access Network; NR; Physical layer procedures for data (Release 15)", 3GPP TS 38.214 V15.3.0, Sep. 2018, pp. 1-96.

* cited by examiner

DETERMINING A POWER HEADROOM REPORT

CROSS-REFERENCE TO RELATED APPLICATIONS

This application is a continuation of patent application Ser. No. 17/206,005 entitled "DETERMINING A POWER HEADROOM REPORT" filed on Mar. 18, 2021, which is a continuation of patent application Ser. No. 16/690,566 entitled "DETERMINING A POWER HEADROOM REPORT" filed on Nov. 21, 2019, which claims priority to U.S. Patent Application Ser. No. 62/770,619 entitled "TIMING FOR A PHR VALUE DETERMINATION FOR NR CA" and filed on Nov. 21, 2018 for Joachim Loehr, which is incorporated herein by reference in its entirety.

FIELD

The subject matter disclosed herein relates generally to wireless communications and more particularly relates to determining a power headroom report.

BACKGROUND

The following abbreviations are herewith defined, at least some of which are referred to within the following description: Third Generation Partnership Project ("3GPP"), $5^{th}$ Generation ("5G"), Positive-Acknowledgment ("ACK"), Aggregation Level ("AL"), Access and Mobility Management Function ("AMF"), Access Point ("AP"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("MEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Non-Orthogonal Multiple Access ("NOMA"), New Radio ("NR"), NR Unlicensed ("NR-U"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), Primary Cell ("PCell"), Policy Control Function ("PCF"), Physical Cell ID ("PCID"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Radio Access Technology ("RAT"), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NSSAI"), Signaling Radio Bearer ("SRB"), Shortened TI ("sTI"), Synchronization Signal ("SS"), Synchronization Signal Block ("SSB"), Supplementary Uplink ("SUL"), Subscriber Permanent Identifier ("SUPI"), Timing Advance ("TA"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Visiting AMF ("vAMF"), Visiting NSSF ("vNSSF"), Visiting PLMN ("VPLMN"), and Worldwide Interoperability for Microwave Access ("WiMAX").

In certain wireless communications networks, a power headroom report may be generated. In such networks, various factors may be used for generating the power headroom report.

BRIEF SUMMARY

Methods for determining a power headroom report are disclosed. Apparatuses and systems also perform the functions of the methods. One embodiment of a method includes determining a power headroom report for transmission on a physical uplink shared channel resource corresponding to a configured grant. In some embodiments, the method includes transmitting the power headroom report on the physical uplink shared channel resource, wherein: determining the power headroom report comprises determining whether the power headroom report is based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

One apparatus for determining a power headroom report includes a processor that determines a power headroom report for transmission on a physical uplink shared channel resource corresponding to a configured grant. In certain embodiments, the apparatus includes a transmitter that transmits the power headroom report on the physical uplink shared channel resource, wherein: the processor determining the power headroom report comprises the processor determining whether the power headroom report is based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

Another embodiment of a method for determining a power headroom report includes receiving a power headroom report on the physical uplink shared channel resource corresponding to a configured grant, wherein: the power headroom report is determined based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

One apparatus for determining a power headroom report includes a receiver that receives a power headroom report on the physical uplink shared channel resource corresponding to a configured grant, wherein: the power headroom report is determined based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
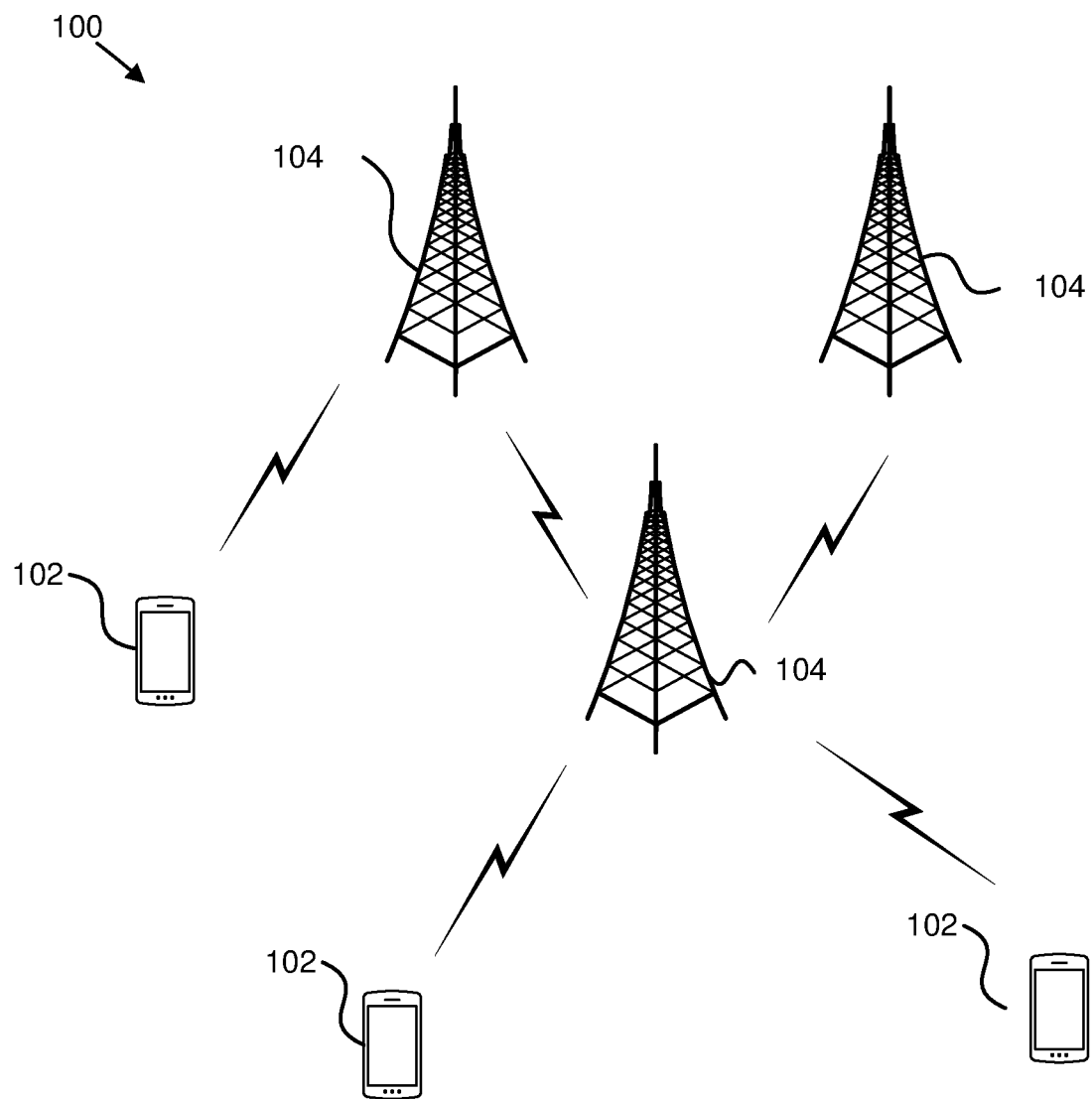
FIG. 1 is a schematic block diagram illustrating one embodiment of a wireless communication system for determining a power headroom report.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a power headroom report. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may determine a power headroom report for transmission on a physical uplink shared channel resource corresponding to a configured grant. In some embodiments, the remote unit 102 may transmit the power headroom report on the physical uplink shared channel resource, wherein: determining the power headroom report comprises determining whether the power headroom report is based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant. Accordingly, the remote unit 102 may be used for determining a power headroom report.

In certain embodiments, a network unit 104 may receive a power headroom report on the physical uplink shared channel resource corresponding to a configured grant, wherein: the power headroom report is determined based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant. Accordingly, the network unit 104 may be used for receiving a power headroom report.

Figure 2:
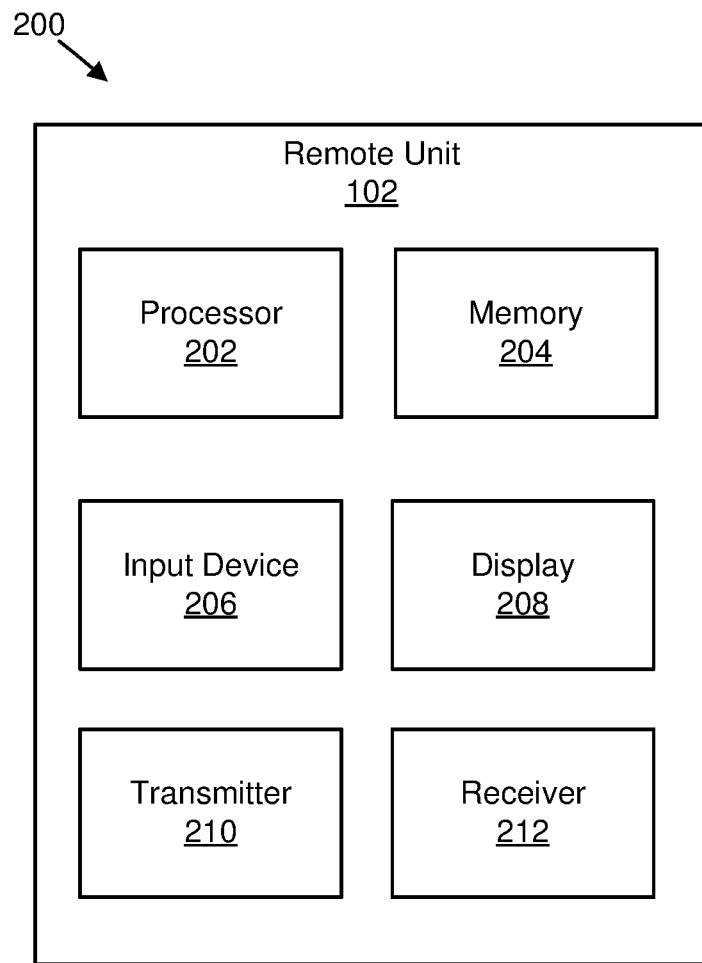
FIG. 2 is a schematic block diagram illustrating one embodiment of an apparatus that may be used for determining a power headroom report.

FIG. 2 depicts one embodiment of an apparatus 200 that may be used for determining a power headroom report. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine a power headroom report for transmission on a physical uplink shared channel resource corresponding to a configured grant. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

In some embodiments, the transmitter 210 transmits a power headroom report on a physical uplink shared channel resource, wherein: the processor 202 determining the power headroom report comprises the processor 202 determining whether the power headroom report is based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
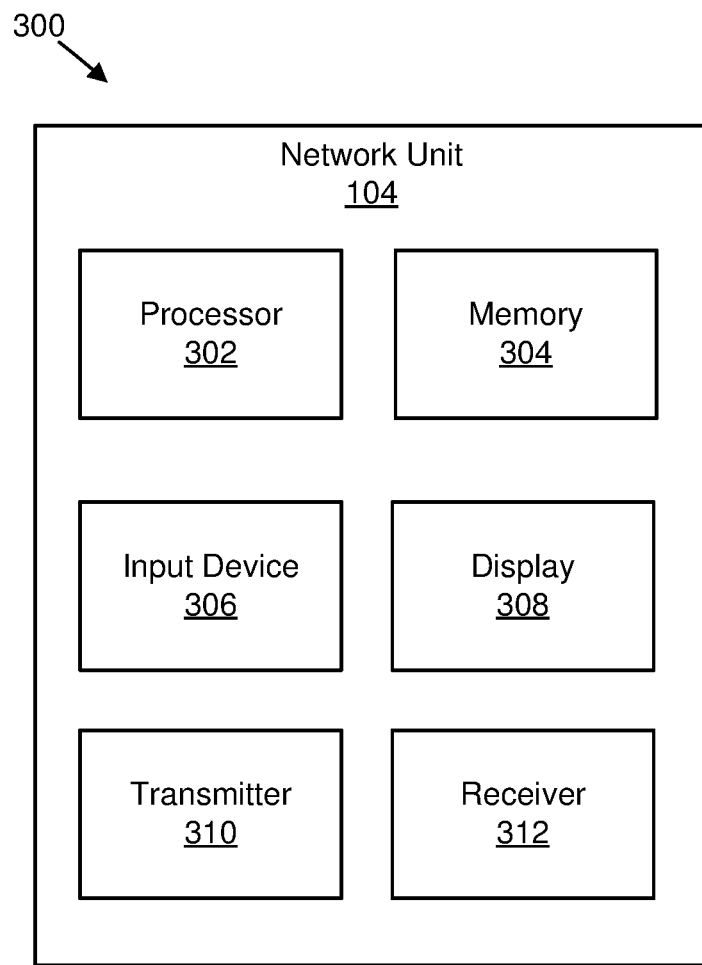
FIG. 3 is a schematic block diagram illustrating one embodiment of an apparatus that may be used for receiving a power headroom report.

FIG. 3 depicts one embodiment of an apparatus 300 that may be used for receiving a power headroom report. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 receives a power headroom report on the physical uplink shared channel resource corresponding to a configured grant, wherein: the power headroom report is determined based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain configurations, to support various requirements of different services, such as eMBB, URLLC, and mMTC, different OFDM numerologies may be supported (e.g., SCS, CP length) in a single framework. Furthermore, in some configurations, diverse requirements in terms of data rates, latency, and coverage may be supported. For example, eMBB may support peak data rates (e.g., 20 Gbps for downlink and 10 Gbps for uplink) and user-experienced data rates in the order of three times what is supported in other configurations. As another example, for URLLC, tighter requirements may be put on ultra-low latency (e.g., 0.5 ms for UL and DL each for user plane latency) and high reliability (e.g., $1\text{-}10^{-5}$ within 1 ms). In another example, mMTC may use a high connection density, large coverage in harsh environments, and/or extremely long-life battery for low cost devices. Therefore, an OFDM numerology (e.g., subcarrier spacing, OFDM symbol duration, CP duration, number of symbols per scheduling interval) that is suitable for one configuration might not work well for another. For example, low-latency services may have a shorter symbol duration (e.g., larger subcarrier spacing) and/or fewer symbols per scheduling interval (e.g., TTI/slot) than an mMTC service. Furthermore, deployment scenarios with large channel delay spreads may use a longer CP duration than scenarios with short delay spreads. In various configurations, the subcarrier spacing may be optimized to retain a similar CP overhead. In some configurations, different numerologies may be applied across different carriers for a given UE as well as different numerologies within the same carrier for a given UE (e.g., different OFDM numerologies may be multiplexed in a frequency-domain and/or a time-domain within the same carrier such as in the context of multiple different BWPs or across different carriers). This may benefit simultaneous support of services with vastly different requirements (e.g., ultra-low latency communications (short symbols and thus wide subcarrier spacing) and MBMS services (long symbols to enable long or extended cyclic prefix and thus narrow subcarrier spacing).

In some configurations, e.g., in a mobile communication system based on LTE protocols, a TI and a subframe both correspond to the same time duration of 1 ms. Both may refer to a 1 ms period associated to different physical channels including a shortest possible interval between two PDCCH occasions, a duration of a transmission of a transport block on PDSCH or PUSCH, and/or a time-domain scheduling granularity. In various configurations, e.g., in a mobile communication system based on the NR protocols, a PDSCH or PUSCH duration for a transmission of a transport block may vary between a mini-slot, a slot, and/or multiple slots. Furthermore, in such configurations, the location of a PUSCH transmission within a slot may vary in terms of a position of a starting OFDM symbol (e.g., front-loaded PUSCH transmission such as PUSCH mapping Type A, or non-front-loaded PUSCH transmission such as PUSCH mapping Type B). In certain configurations, a UE may be configured to monitor a DL control channel in terms of slot or OFDM symbol with respect to a numerology of the DL control channel. Therefore, the UE may be configured to monitor the PDCCH on PDCCH monitoring occasions once every number of slots (e.g., on a subset of PDCCH monitoring candidates).

As used herein, TTI may refer to a time period (e.g., one or more OFDM symbols) for which a UE is configured to monitor a downlink control channel and/or a PDCCH (e.g., on a specific CORESET) as well as a duration of a data transmission on PDSCH and/or PUSCH.

In various configurations, for aggregating multiple serving cells and/or component carriers with different numerologies (e.g., NR CA), a PHR reporting functionality may consider possible different timings of aggregated component carriers and/or cells.

In certain configurations, to support different numerologies, one slot of a component carrier and/or serving cell may overlap with multiple slots of another carrier (e.g., eMBB on one carrier and URLLC on another carrier). In some configurations, a relative timing (e.g., time period) between PDCCH (DCI) and a corresponding PUSCH allocation may vary dynamically (e.g., may be indicated within an UL grant (DCI)).

In various configurations, power headroom reporting in NR CA may have complications related to a size of an extended PHR MAC CE. In some configurations, because of a very high data rate and/or low latency, a processing time available for both a transmitter and a receiver may be limited (e.g., for generating and/or decoding a TB). Therefore, in such embodiments, L2 protocol functions may be performed in a processing-power-friendly way. In certain configurations, no concatenation is supported in an RLC layer. Not supporting concatenation in the RLC layer may enable pre-processing of both an RLC layer and a MAC layer before receiving an UL grant (e.g., a PDCP SDU may be pre-constructed to a MAC SDU with its own MAC sub-header). In some embodiments, UL MAC CEs may be placed at an end of the TB before any potential padding. This may enable a transmitter to immediately start feeding part of the TB to a PHY as soon as an UL grant is received. If the MAC CE is placed at the beginning of the TB, the transmitter may need to wait until the MAC CE content is generated before channel coding can start. In certain embodiments, computation of a BSR and/or PHR MAC CE may be done at a later point of time because both reflect a latest status before transmission (e.g., BSR may be only calculate after LCP has been finalized).

In various embodiments, because a size of an extended PHR MAC CE is not fixed but depends on a number of activated serving cells and/or component carriers and on whether virtual or real PH is reported for a serving cell (e.g., since $P_{cmax,c}$ is not reported for a virtual PHR), generation of a TB from a processing timing perspective may be more challenging if an extended PHR MAC CE is multiplexed in a TB. In certain embodiments, if generating a TB (e.g., during LCP), because MAC CEs are generally prioritized over data channels, a UE may first reserve sufficient space within a TB for MAC CEs before assigning data to the logical channels (e.g., DRBs). However, if the size of a MAC CE is only known at a late point of time, the LCP procedure may be delayed. In some embodiments, to decide a size of an extended PHR MAC CE for NR CA (e.g., if a UE is aggregating multiple serving cells with different numerologies and/or slot lengths), a UE may determine whether a virtual uplink transmission or a real uplink transmission takes place on the serving cells in a slot for which PHR is reported. However, if different numerologies with different slot length and/or timing relations are used on the serving cells, the UE may not know immediately (e.g., upon having received an UL grant), whether PH information for other serving cells is calculated based on actual or virtual uplink transmission.

In some embodiments, because a UE may determine a PHR MAC CE size before starting LCP and a size of PHR MAC CE may depend on whether virtual of real PH is reported for a serving cell, UE may determine whether actual or virtual PHR is reported for a serving based on UL resource allocation related signaling (e.g., DCI, configured grant allocations, etc.) that has been received up until a first UL grant is received since PHR has been triggered. In certain embodiments, a first UL resource (e.g., for a new transmission) after a PHR has been triggered may be a configured grant (e.g., type 1 or type 2) and there may be no dynamic UL grant received between PHR triggering and the configured grant.

Figure 4:
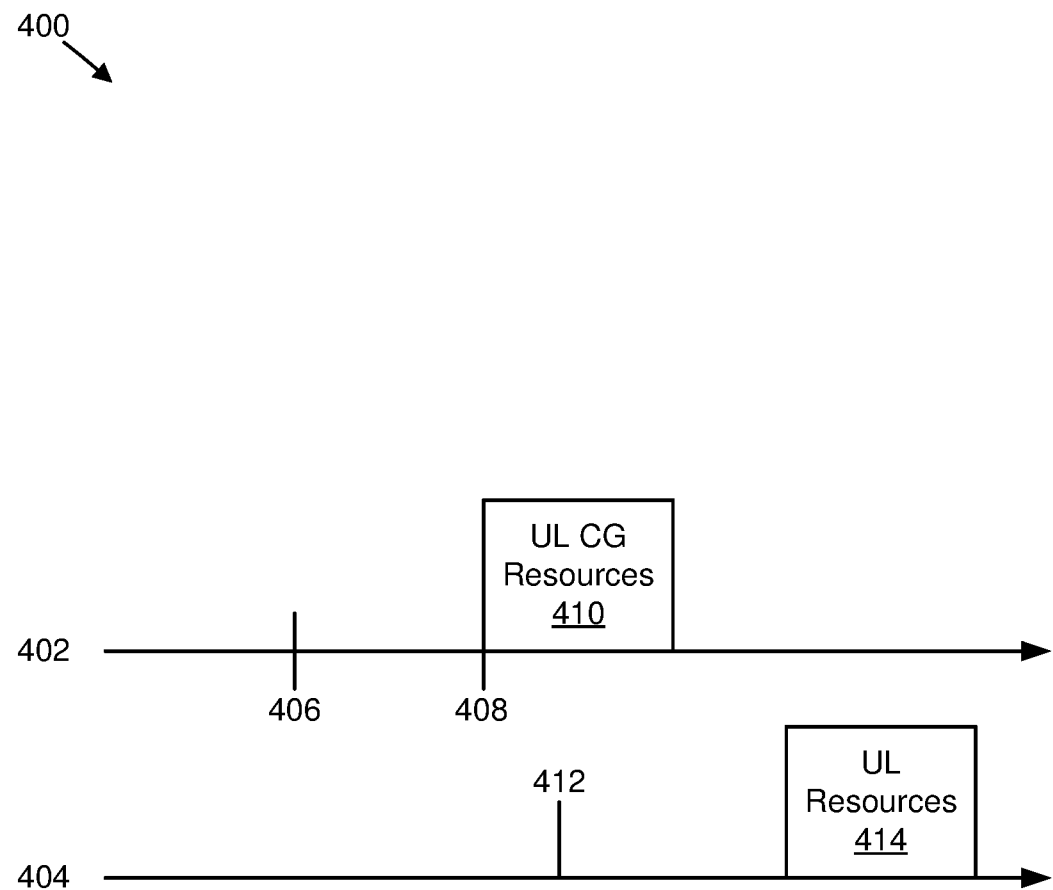
FIG. 4 is a diagram illustrating one embodiment of UL resource scheduling.

FIG. 4 is a diagram illustrating one embodiment of UL resource scheduling 400. A timing diagram is illustrated for a first cell 402 and a second cell 404. In the timing diagram ured grants and downlink control information that has been received until and including a PDCCH occasion in which a first UL grant for a new transmission is received since a PHR has been triggered if the PHR MAC CE is reported on an uplink grant received on the PDCCH or until the first uplink symbol of PUSCH transmission minus a PUSCH processing time (e.g., as defined in Section 6.4 of 38.214) if the PHR MAC CE is reported on a configured grant.

A PUSCH preparation and/or processing procedure time may be defined as shown in Table 1.

TABLE 1

UE PUSCH Preparation Procedure Time

If the first uplink symbol in the PUSCH allocation for a transport block, including the DM-RS, as defined by the slot offset $K_2$ and the start and length indicator SLIV of the scheduling DCI, is no earlier than at symbol $L_2$, where $L_2$ is defined as the next uplink symbol with its CP starting $T_{proc,2} = \max((N_2 + d_{2,1})(2048 + 144) \cdot \kappa 2^{-\mu} \cdot T_C, d_{2,2})$ after the end of the last symbol of the PDCCH carrying the DCI scheduling the PUSCH, then the UE shall transmit the transport block.
- $N_2$ is based on μ of Table 6.4-1 and Table 6.4-2 for UE processing capability 1 and 2 respectively, where μ corresponds to the one of ($μ_{DL}$, $μ_{UL}$) resulting with the largest $T_{proc,2}$, where the $μ_{DL}$ corresponds to the subcarrier spacing of the downlink with which the PDCCH carrying the DCI scheduling the PUSCH was transmitted and $μ_{UL}$ corresponds to the subcarrier spacing of the uplink channel with which the PUSCH is to be transmitted, and κ is defined in subclause 4.1 of [4, TS 38.211].
- If the first symbol of the PUSCH allocation consists of DM-RS only, then $d_{2,1} = 0$, otherwise $d_{2,1} = 1$.
- If the UE is configured with multiple active component carriers, the first uplink symbol in the PUSCH allocation further includes the effect of timing difference between component carriers as given in [11, TS 38.133].
- If the scheduling DCI triggered a switch of BWP, $d_{2,2}$ equals to the switching time as defined in [11, TS 38.133], otherwise $d_{2,2}=0$.
- If the PUSCH indicated by the DCI is overlapping with one or more PUCCH channels, then the transport block is multiplexed following the procedure in subclause 9.2.5 of [9, TS 38.213], otherwise the transport block is transmitted on the PUSCH indicated by the DCI.

Otherwise the UE may ignore the scheduling DCI.
The value of $T_{proc,2}$ is used both in the case of normal and extended cyclic prefix.

Table 1a: PUSCH preparation time for PUSCH timing capability 1

| μ | PUSCH preparation time $N_2$ [symbols] |
|---|---|
| 0 | 10 |
| 1 | 12 |
| 2 | 23 |
| 3 | 36 |

Table 1b: PUSCH preparation time for PUSCH timing capability 2

| μ | PUSCH preparation time $N_2$ [symbols] |
|---|---|
| 0 | 5 |
| 1 | 5.5 |
| 2 | 11 for frequency range 1 | for the first cell 402, a PHR is triggered at a first time 406, and at a second time 408, a configured grant ("CG") type 1 is provided for UL CG resources 410. In the timing diagram for the second cell 404, at a first time 412, DCI (e.g., UL grant) is received that allocates UL resources 414.

In various configurations, a PHR MAC CE is transmitted on a configured grant resource. Thus, the timing for determining actual vs. virtual PHR is done by considering UL scheduling related signaling received until the starting symbol of a PUSCH transmission containing the PHR MAC CE minus some predefined offset (e.g., PUSCH processing time).

In some embodiments, a timing for determining actual vs. virtual PHR is as follows: a MAC entity determines whether a PH value for an activated serving cell is based on real transmission or a reference format by considering config- In various embodiments, a PUSCH processing and/or preparation time may be only defined for a dynamic grant and not for the case in which a PHR MAC CE is transmitted on a configured grant resource (e.g., there is no PUSCH processing and/or preparation timing defined for a configured grant).

As used herein, eNB and/or gNB may be used for a base station but may be replaceable by any other radio access node (e.g., BS, eNB, gNB, AP, NR, etc.). Moreover, methods and devices described herein may be applicable to IEEE 802.11 variants, GSM, GPRS, UMTS, LTE variants, CDMA2000, Bluetooth, ZigBee, Sigfoxx, and so forth. Furthermore, methods and devices described herein may be applicable to a next generation mobile network in which an MME maps to an AMF and an SMF, an HSS maps to a UDM and/or UDR, and/or an SGW and/or a PGW map to a UPF.

In a first embodiment, a MAC entity may determine whether to report actual or virtual PHR for a serving cell at a latest possible timing and/or PDCCH occasion before a configured grant resource carrying a PHR MAC CE in which a hypothetical dynamic grant (e.g., DCI) may override the configured grant allocation. In some embodiments, $T_{proc,2}=\max((N_2+d_{2,1})(2048+144)\cdot\kappa 2^{-\mu}\cdot T_c, d_{2,2})$, with all parameters as defined herein, defines a minimum time between a PDCCH carrying DCI scheduling a PUSCH and the PUSCH resource (e.g., a minimum time a UE needs for preparation and/or transmission of a corresponding transport block). In various embodiments, a UE MAC may determine whether a PH value for an activated serving cell is based on a real transmission or a reference format by considering configured grants and downlink control information that has been received up until a first uplink symbol of the PUSCH transmission minus $T_{proc,2}$ if the PHR MAC CE is reported on a configured grant. For the calculation of $T_{proc,2}$, a UE may need to know an $N_2$ value that depends on numerologies used for DL and UL channel, carrier, and/or BWP. In such embodiments, a numerology and/or SCS of the uplink channel with which the PUSCH (e.g., configured grant resource) is to be transmitted $\mu_{UL}$ may be known (e.g., from the semi-static configuration of the UL numerology/SCS of the UL BWP on which the configured grant resources are configured), however, $\mu_{DL}$, the subcarrier spacing of the downlink with which the PDCCH carrying the DCI scheduling the PUSCH was transmitted, is not known (e.g. since there is no DCI for a configured grant). In one embodiment, $\mu_{DL}$ is set to a highest subcarrier spacing value $\mu$ among potential configured subcarrier spacings used for a hypothetical PDCCH carrying an DCI overriding a configured grant resource (e.g., configured grant resource on which PHR MAC CE is transmitted). The term overriding DCI may refer to a PDCCH carrying an UL DCI assigning PUSCH resources for a PUSCH duration (e.g., time allocation) that overlaps with the PUSCH duration (e.g., time allocation) of the configured uplink grant. In certain embodiments, a UE may check which subcarrier spacing (e.g., $\mu$ value) may be used for an overriding DCI (e.g., check which cell(s)/BWP(s) may be used for the transmission of an overriding DCI, and select the subcarrier spacing value $\mu$ as $\mu_{DL}$ that corresponds to a smallest $T_{proc,2}$ value). Selecting a subcarrier spacing value as $\mu_{DL}$ that corresponds to the smallest $T_{proc,2}$ may ensure that the UE determines the PHR value (e.g., actual vs. virtual PHR) at a latest point of time before a configured grant in which an overriding DCI may occur. In one example, only DL numerologies/SCSs are considered that are configured for all configured DL BWPs of a serving cell on which UL configured resources are configured on. In another example, all DL numerologies/SCSs of all different DL BWPs of all serving cells are considered (e.g., motivated by cross-carrier scheduling). A determined $\mu_{DL}$ may be used for the calculation of $T_{proc,2}$.

In some embodiments, $d_{2,2}$ is set to zero for the calculation of $T_{proc,2}$ (e.g., assuming that an overriding DCI doesn't switch an UL BWP). In various embodiments, $d_{2,2}$ is set to a smallest and/or largest switching time configured for the configured UL BWPs of a serving cell (e.g., assuming that the UL BWP is switched). In certain embodiments, $d_{2,2}$ is set to a switching time corresponding to an UL BWP switch from a predetermined UL BWP to the UL BWP on which the UL configured resources are configured. In such embodiments, the predetermined UL BWP may be: (i) an initial UL BWP; (ii) a first active UL BWP; and/or (iii) the UL BWP with a lowest and/or highest BWP index. In some embodiments, $d_{2,2}$ is set to zero if a predetermined UL BWP is the same as an UL BWP on which UL configured resources are configured.

In various embodiments, a UE only considers $\mu_{UL}$ for the calculation of $T_{proc,2}$, e.g., $\mu_{DL}$ is discarded for the calculation of $T_{proc,2}$ formula. In such embodiment, the subcarrier spacing for determining $N_2$ (e.g., PUSCH preparation time) is the subcarrier spacing of an uplink channel with which a PUSCH (e.g., configured grant resource) is to be transmitted. Accordingly, $T_{proc,2}$ may be calculated by setting $\mu$ to $\mu_{UL}$.

In certain embodiments, $\mu_{DL}$ may be set to a predefined value for calculation of $T_{proc,2}$. In various embodiment, there may be at least the following options for defining $\mu_{DL}$ for calculation of $T_{proc,2}$ if the PHR MAC CE is transmitted on a configured grant: a) a highest subcarrier spacing ($\mu$) among all DL subcarrier spacings configured for the UE (e.g., subcarrier spacings associated with the configured DL BWPs of the aggregated serving cells; b) a subcarrier spacing ($\mu$) of the DL BWP with a same index as the UL BWP on which the configured grant is allocated; c) a highest subcarrier spacing ($\mu$) of the configured DL BWPs of the serving cell on which the configured UL resource is allocated; d) $\mu_{DL}$ is set to a fixed value (e.g., $\mu_{DL}=3$ for PUSCH timing capability 1 and $\mu_{DL}=2$ for PUSCH timing capability 2); e) $\mu_{DL}$ is set to zero; f): a lowest subcarrier spacing ($\mu$ value) of the configured DL BWPs of the serving cell on which the configured UL resource is allocated. Setting $\mu_{DL}$ to the lowest subcarrier spacing ($\mu$) among the configured DL BWPs allows for the largest processing time $T_{proc,2}$; g) a subcarrier spacing ($\mu$) of the configured DL BWP(s) of the serving cell on which the configured UL resource is allocated that corresponds to the largest $T_{proc,2}$ value; h) a lowest subcarrier spacing ($\mu$) among all DL subcarrier spacings configured for the UE (e.g., subcarrier spacings associated with the configured DL BWPs of the aggregated serving cells; i) a subcarrier spacing ($\mu$) of the DL BWP that is paired, if present, with the UL BWP in which the configured grant is allocated; j) a subcarrier spacing ($\mu$) of the initial DL BWP; k) a subcarrier spacing ($\mu$) of the default DL BWP; l) a subcarrier spacing ($\mu$) of the first active DL BWP; m) a subcarrier spacing ($\mu$) of the current active DL BWP; n) a highest and/or lowest subcarrier spacing ($\mu$) among the values described in options (b), (g), (h), (i), (j), (k), (l), (m), or a subset; and/or o) a semi-statically, dynamically, and/or semi-dynamically indicated DL subcarrier spacing ($\mu$) (e.g., an extra RRC parameter in the configuration of the UL configured grant resources or an extra field in the activation DCI for UL configured grant resources (type 2) that indicates what DL subcarrier spacing ($\mu$) to use in the $T_{proc,2}$ formula).

In some embodiments, a UE/MAC may determine whether actual or virtual PHR is reported for a serving cell by considering configured grants and downlink control information that has been received up until a first uplink symbol of a PUSCH transmission minus a time offset given by a slot offset $K_2$ and a start and length indicator SLIV of the DCI that activated the configured grant if PHR MAC CE is transmitted on a configured grant type 2.

In certain embodiments, there may be two types of transmission without dynamic grant: configured grant Type 1 in which an uplink grant is provided by RRC and stored as a configured uplink grant; and configured grant Type 2 in which an uplink grant is provided by PDCCH and stored or cleared as a configured uplink grant based on L1 signaling indicating configured uplink grant activation or deactivation.

In various embodiments, Type 1 and Type 2 transmissions are configured by RRC per serving cell and per BWP. For Type 2, activation and deactivation may be independent among the serving cells. The DCI activating a configured grant may be stored and may reoccur with a configured periodicity (e.g., RRC configured). Each configured grant resource may be assumed to have a corresponding DCI that is used as a reference time point for determining actual versus virtual PHR.

In some embodiments, a MAC determines whether a PH value for an activated serving cell is based on a real transmission or a reference format by considering configured grants and downlink control information that has been received up until and including a PDCCH occasion in which DCI associated with the configured grant (e.g., reoccurring activation DCI) is received if the PHR MAC CE is reported on a configured grant type 2. In various embodiments, a UE/MAC uses DCI used for activation of a configured grant (e.g., Type 2) for calculation of $T_{proc,2}$. In such embodiments, the MAC determines whether the PH value for an activated serving cell is based on a real transmission or a reference format by considering configured grants and downlink control information that has been received up until a first uplink symbol of a PUSCH transmission minus $T_{proc,2}$—calculated based on the activation DCI—if the PHR MAC CE is reported on a configured grant type 2. In one example, a $d_{2,2}$ value (e.g., for whether an UL BWP switching is needed or not) that is determined based on the activation DCI for the first instance of the UL configured grant Type-2 resources are re-used for all repetitions and/or reoccurrences of that UL configured grant Type-2.

In certain embodiments, a UE MAC entity determines whether a PH value for an activated serving cell is based on a real transmission or a reference format by considering configured grants and downlink control information that has been received up until and including a PDCCH occasion in which a first UL grant for a new transmission is received since a PHR has been triggered or by considering the configured grants and downlink control information that has been received until the first uplink symbol of PUSCH transmission minus some predefined time (e.g., $T_{proc,2}$), whichever comes first. If a DCI for a new transmission is received earlier than the first uplink symbol of the PUSCH transmission (e.g., where PHR MAC CE is transmitted) minus some predefined time (e.g., $T_{proc,2}$) the MAC determines actual vs. virtual PHR based on the UL resource related control signaling (e.g., configured grant allocations, DCI, MAC CE etc.) that is received up until and including the PDCCH occasion in which the DCI (e.g., UL grant) is received.

In various embodiments, a UE/MAC determines whether a PH value for an activated serving cell is based on a real transmission or a reference format by considering configured grants and UL scheduling related downlink control information that has been received up until and including a PDCCH occasion in which a first UL grant for a new transmission is received since a PHR has been triggered if the UE has received an UL DCI for a new transmission between the PHR triggering instance and the PUSCH carrying the PHR MAC CE, and the PDCCH occasion of the first received UL grant for a new transmission after PHR has been triggered is not later than $T_{proc,2}$ (symbols) before the first uplink symbol of the PUSCH transmission carrying the PHR MAC CE; otherwise, the MAC determines whether the PH value for an activated serving cell is based on a real transmission or a reference format by considering the configured grants and UL scheduling related downlink control information that has been received up until the first uplink symbol of PUSCH transmission minus the PUSCH processing time if the PHR MAC CE is reported on a configured grant.

Figure 5:
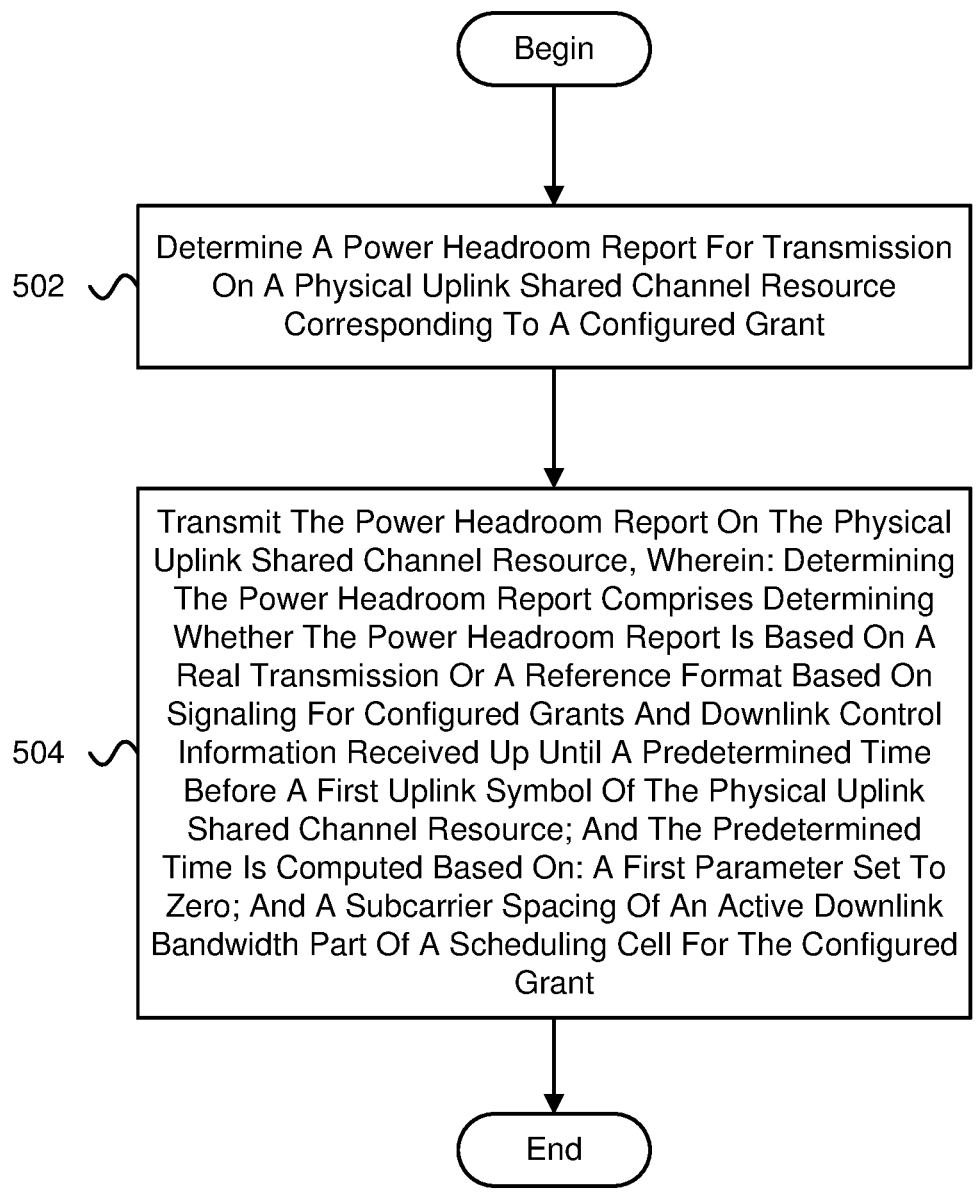
FIG. 5 is a flow chart diagram illustrating one embodiment of a method for determining a power headroom report.

FIG. 5 is a flow chart diagram illustrating one embodiment of a method 500 for determining a power headroom report. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include determining 502 a power headroom report for transmission on a physical uplink shared channel resource corresponding to a configured grant. In some embodiments, the method 500 includes transmitting 504 the power headroom report on the physical uplink shared channel resource, wherein: determining the power headroom report comprises determining whether the power headroom report is based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

In certain embodiments, the signaling for the configured grants comprises signaling for the configured grant associated with the physical uplink shared channel resource on which the power headroom report is transmitted. In some embodiments, the predetermined time is a physical uplink shared channel preparation procedure time determined ($T_{proc,2}$) for the configured grant. In various embodiments, the first parameter set to zero corresponds to a switching time ($d_{2,2}$) used for calculation of the physical uplink shared channel preparation procedure time of the configured grant.

In one embodiment, the subcarrier spacing of the active downlink bandwidth part of the scheduling cell for the configured grant is used as a downlink subcarrier spacing $\mu_{DL}$ for calculation of the physical uplink shared channel preparation procedure time of the configured grant. In certain embodiments, a medium access control entity determines the power headroom report. In some embodiments, the predetermined time is computed based on a second parameter set to one.

In various embodiments, the predetermined time is computed based on a third parameter corresponding to a look-up table. In one embodiment, the subcarrier spacing of the active downlink bandwidth part of the scheduling cell for the configured grant is used to determine the third parameter from the look-up table.

Figure 6:
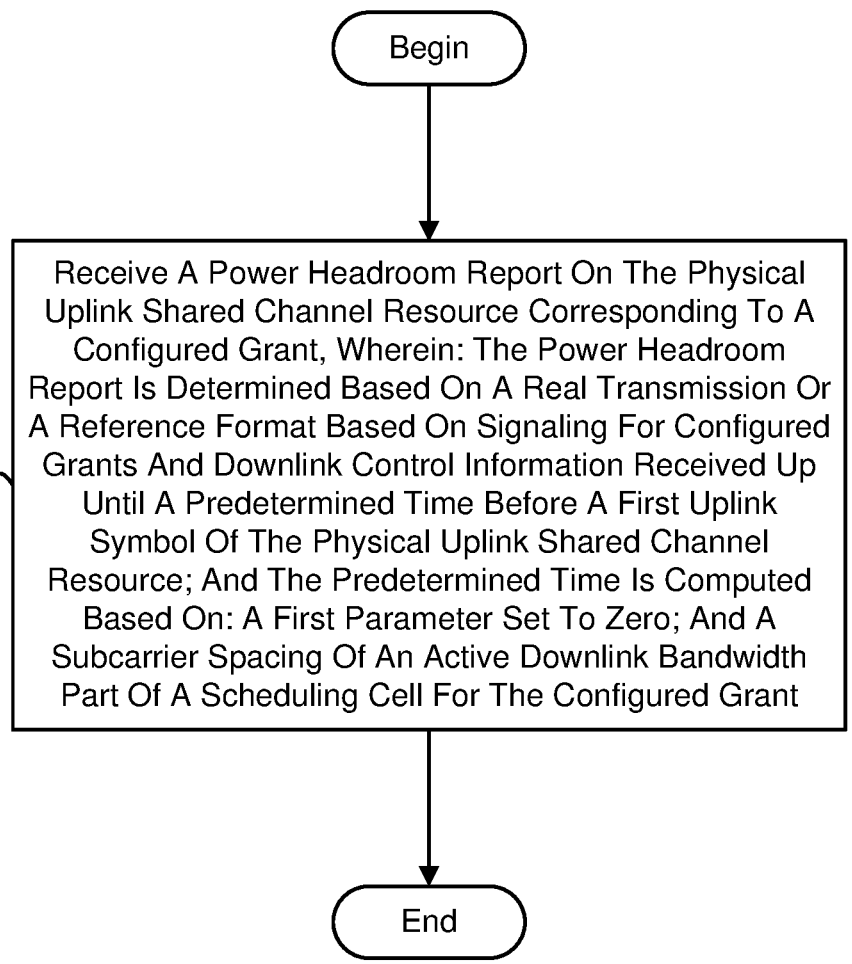
FIG. 6 is a flow chart diagram illustrating another embodiment of a method for determining a power headroom report.

FIG. 6 is a flow chart diagram illustrating another embodiment of a method 600 for determining a power headroom report. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a power headroom report on the physical uplink shared channel resource corresponding to a configured grant, wherein: the power headroom report is determined based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

In certain embodiments, the signaling for the configured grants comprises signaling for the configured grant associated with the physical uplink shared channel resource on which the power headroom report is received. In some embodiments, the predetermined time is a physical uplink shared channel preparation procedure time ($T_{proc,2}$) determined for the configured grant. In various embodiments, the first parameter set to zero corresponds to a switching time ($d_{2,2}$) used for calculation of the physical uplink shared channel preparation procedure time of the configured grant.

In one embodiment, the subcarrier spacing of the active downlink bandwidth part of the scheduling cell for the configured grant is used as a downlink subcarrier spacing $\mu_{DL}$ for calculation of the physical uplink shared channel preparation procedure time of the configured grant. In certain embodiments, a medium access control entity determines the power headroom report. In some embodiments, the predetermined time is computed based on a second parameter set to one.

In various embodiments, the predetermined time is computed based on a third parameter corresponding to a look-up table. In one embodiment, the subcarrier spacing of the active downlink bandwidth part of the scheduling cell for the configured grant is used to determine the third parameter from the look-up table.

In one embodiment, a method comprises: determining a power headroom report for transmission on a physical uplink shared channel resource corresponding to a configured grant; and transmitting the power headroom report on the physical uplink shared channel resource, wherein: determining the power headroom report comprises determining whether the power headroom report is based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

In certain embodiments, the signaling for the configured grants comprises signaling for the configured grant associated with the physical uplink shared channel resource on which the power headroom report is transmitted.

In some embodiments, the predetermined time is a physical uplink shared channel preparation procedure time determined ($T_{proc,2}$) for the configured grant.

In various embodiments, the first parameter set to zero corresponds to a switching time ($d_{2,2}$) used for calculation of the physical uplink shared channel preparation procedure time of the configured grant.

In one embodiment, the subcarrier spacing of the active downlink bandwidth part of the scheduling cell for the configured grant is used as a downlink subcarrier spacing $\mu_{DL}$ for calculation of the physical uplink shared channel preparation procedure time of the configured grant.

In certain embodiments, a medium access control entity determines the power headroom report.

In some embodiments, the predetermined time is computed based on a second parameter set to one.

In various embodiments, the predetermined time is computed based on a third parameter corresponding to a look-up table.

In one embodiment, the subcarrier spacing of the active downlink bandwidth part of the scheduling cell for the configured grant is used to determine the third parameter from the look-up table.

In one embodiment, an apparatus comprises: a processor that determines a power headroom report for transmission on a physical uplink shared channel resource corresponding to a configured grant; and a transmitter that transmits the power headroom report on the physical uplink shared channel resource, wherein: the processor determining the power headroom report comprises the processor determining whether the power headroom report is based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

In certain embodiments, the signaling for the configured grants comprises signaling for the configured grant associated with the physical uplink shared channel resource on which the power headroom report is transmitted.

In some embodiments, the predetermined time is a physical uplink shared channel preparation procedure time ($T_{proc,2}$) determined for the configured grant.

In various embodiments, the first parameter set to zero corresponds to a switching time ($d_{2,2}$) used for calculation of the physical uplink shared channel preparation procedure time of the configured grant.

In one embodiment, the subcarrier spacing of the active downlink bandwidth part of the scheduling cell for the configured grant is used as a downlink subcarrier spacing $\mu_{DL}$ for calculation of the physical uplink shared channel preparation procedure time of the configured grant.

In certain embodiments, a medium access control entity determines the power headroom report.

In some embodiments, the predetermined time is computed based on a second parameter set to one.

In various embodiments, the predetermined time is computed based on a third parameter corresponding to a look-up table.

In one embodiment, the subcarrier spacing of the active downlink bandwidth part of the scheduling cell for the configured grant is used to determine the third parameter from the look-up table.

In one embodiment, a method comprises: receiving a power headroom report on the physical uplink shared channel resource corresponding to a configured grant, wherein: the power headroom report is determined based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

In certain embodiments, the signaling for the configured grants comprises signaling for the configured grant associated with the physical uplink shared channel resource on which the power headroom report is received.

In some embodiments, the predetermined time is a physical uplink shared channel preparation procedure time ($T_{proc,2}$) determined for the configured grant.

In various embodiments, the first parameter set to zero corresponds to a switching time ($d_{2,2}$) used for calculation of the physical uplink shared channel preparation procedure time of the configured grant.

In one embodiment, the subcarrier spacing of the active downlink bandwidth part of the scheduling cell for the configured grant is used as a downlink subcarrier spacing $\mu_{DL}$ for calculation of the physical uplink shared channel preparation procedure time of the configured grant.

In certain embodiments, a medium access control entity determines the power headroom report.

In some embodiments, the predetermined time is computed based on a second parameter set to one.

In various embodiments, the predetermined time is computed based on a third parameter corresponding to a look-up table.

In one embodiment, the subcarrier spacing of the active downlink bandwidth part of the scheduling cell for the configured grant is used to determine the third parameter from the look-up table.

In one embodiment, an apparatus comprises: a receiver that receives a power headroom report on the physical uplink shared channel resource corresponding to a configured grant, wherein: the power headroom report is determined based on a real transmission or a reference format based on signaling for configured grants and downlink control information received up until a predetermined time before a first uplink symbol of the physical uplink shared channel resource; and the predetermined time is computed based on: a first parameter set to zero; and a subcarrier spacing of an active downlink bandwidth part of a scheduling cell for the configured grant.

In certain embodiments, the signaling for the configured grants comprises signaling for the configured grant associated with the physical uplink shared channel resource on which the power headroom report is received.

In some embodiments, the predetermined time is a physical uplink shared channel preparation procedure time ($T_{proc,2}$) determined for the configured grant.

In various embodiments, the first parameter set to zero corresponds to a switching time ($d_{2,2}$) used for calculation of the physical uplink shared channel preparation procedure time of the configured grant.

In one embodiment, the subcarrier spacing of the active downlink bandwidth part of the scheduling cell for the configured grant is used as a downlink subcarrier spacing $\mu_{DL}$ for calculation of the physical uplink shared channel preparation procedure time of the configured grant.

In certain embodiments, a medium access control entity determines the power headroom report.

In some embodiments, the predetermined time is computed based on a second parameter set to one.

In various embodiments, the predetermined time is computed based on a third parameter corresponding to a look-up table.

In one embodiment, the subcarrier spacing of the active downlink bandwidth part of the scheduling cell for the configured grant is used to determine the third parameter from the look-up table.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive a configured grant for a physical uplink shared channel (PUSCH) transmission associated with a power headroom report;
determine a processing time based at least partly on a parameter comprising a null value and a subcarrier spacing of a downlink bandwidth part (BWP) associated with a cell for the configured grant;
determine whether the power headroom report for an activated serving cell is based on an actual PUSCH transmission or a reference format based at least partly on signaling of the configured grant and downlink control information received until a beginning symbol of the PUSCH transmission minus the processing time associated with the PUSCH transmission; and
transmit the power headroom report via the PUSCH transmission.

2. The UE of claim 1, wherein the processing time comprises a PUSCH preparation procedure time $T_{proc,2}$.

3. The UE of claim 1, wherein the parameter comprises a switching time ($d_{2,2}$), and wherein the at least one processor is configured to cause the UE determine the processing time based at least partly on the $d_{2,2}$.

4. The UE of claim 1, wherein the subcarrier spacing comprises a downlink subcarrier spacing ($\mu DL$), and wherein the at least one processor is configured to cause the UE to determine the processing time based at least partly on the $\mu_{DL}$.

5. The UE of claim 1, further comprising:
a medium access control (MAC) entity coupled with the at least one processor, and
wherein the at least one processor is configured to cause the UE to determine the power headroom report.

6. The UE of claim 1, wherein the at least one processor is configured to cause the UE to determine the processing time based at least partly on a second parameter comprising a value of one.

7. The UE of claim 6, wherein the second parameter comprises a switching time ($d_{2,1}$).

8. The UE of claim 1, wherein the at least one processor is configured to cause the UE to determine the processing time based at least partly on a third parameter associated with a quantity of symbols associated with the processing time.

9. The UE of claim 8, wherein the quantity of symbols associated with the processing time is based at least partly on the subcarrier spacing.

10. The UE of claim 8, wherein the at least one processor is configured to cause the UE to determine the quantity of symbols associated with the processing time based at least partly on a lookup table, and wherein the lookup table associates the quantity of symbols to the subcarrier spacing.

11. A method performed by a user equipment (UE), the method comprising:
receiving a configured grant for a physical uplink shared channel (PUSCH) transmission associated with a power headroom report;
determining a processing time based at least partly on a parameter comprising a null value and a subcarrier spacing of a downlink bandwidth part (BWP) associated with a cell for the configured grant;
determining whether the power headroom report for an activated serving cell is based on an actual PUSCH transmission or a reference format based at least partly on signaling of the configured grant and downlink control information received until a beginning symbol of the PUSCH transmission minus the processing time associated with the PUSCH transmission; and
transmitting the power headroom report via the PUSCH transmission.

12. The method of claim 11, wherein the processing time comprises a PUSCH preparation procedure time $T_{proc,2}$.

13. The method of claim 11, wherein the parameter comprises a switching time ($d_{2,2}$), and wherein determining the processing time is based at least partly on the $d_{2,2}$.

14. The method of claim 11, wherein the subcarrier spacing comprises a downlink subcarrier spacing ($\mu_{DL}$), and wherein determining the processing time is based at least partly on the $\mu_{DL}$.

15. The method of claim 11, wherein determining the power headroom report based at least partly on a medium access control (MAC) entity of the UE.

16. The method of claim 11, wherein determining the processing time is based at least partly on a second parameter comprising a value of one.

17. The method of claim 16, wherein the second parameter comprises a switching time ($d_{2,1}$).

18. The method of claim 11, wherein determining the processing time is based at least partly on a third parameter associated with a quantity of symbols associated with the processing time.

19. The method of claim 18, wherein the quantity of symbols associated with the processing time is based at least partly on the subcarrier spacing.

20. The method of claim 18, wherein determining the quantity of symbols associated with the processing time is based at least partly on a lookup table, and wherein the lookup table associates the quantity of symbols to the subcarrier spacing.

\* \* \* \* \*